Feb. 4, 1930.                    W. NOBLE                    1,745,860
                                  PISTON
                            Filed June 17, 1927
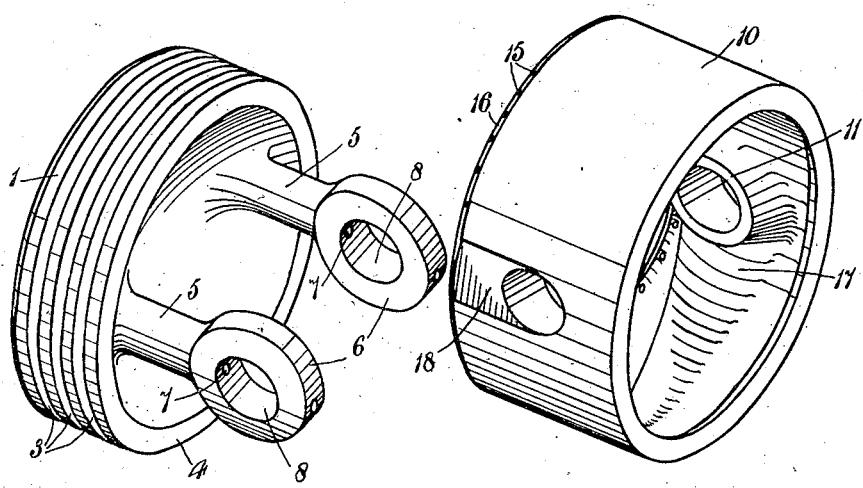
Fig.3.                                              Fig.4.
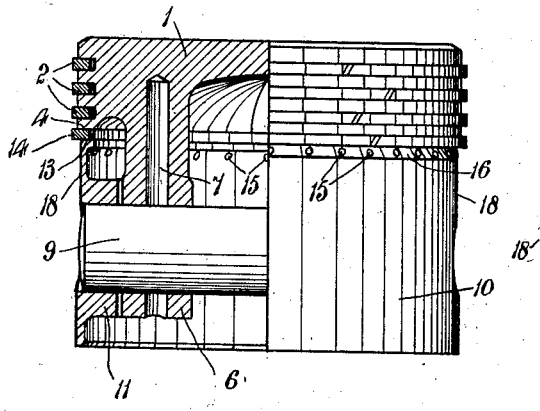
Fig.1.                                              Fig.2.
Inventor
Warren Noble.
By
Attorney Patented Feb. 4, 1930

1,745,860

UNITED STATES PATENT OFFICE

WARREN NOBLE, OF DETROIT, MICHIGAN

PISTON

Application filed June 17, 1927. Serial No. 199,470.

This invention relates to pistons, more particularly for internal combustion engines, and has for its object to provide a piston of simple design which lends itself admirably to manufacture on a production scale, and which is especially free from warping or strain irrespective of high temperatures and resultant expansion of parts of the piston when in use.

In my co-pending applications, Serial Numbers 199,472 and 199,471 filed herewith are disclosed respectively a piston with a fixed skirt having a free oil ring interposed between the upper part of the skirt and the lower face of the head of the piston, and a piston wherein provision is made for a floating head relative to the skirt, and the present invention has for its object to combine the features of these two structures whereby they co-operate in their functions to produce a very efficient piston and to augment the functions of certain of the elements.

The said invention further has for one of its objects to provide for the restraining of transmission of heat from the head to the skirt of the piston by imposing a plurality of surfaces capable of maintaining oil films between the said head and the said skirt, and more particularly, so far as heat transmission is concerned, the provision of that characteristic in a piston wherein heat can be transferred from the head of the piston to the upper part of the skirt only through an intermediate disconnected member and through oil films between the said member and the head and the skirt; and on the other hand from wrist pin bosses to the skirt through the wrist pin of the piston and through oil films interposed between the wrist pin and the bosses and between the wrist pin and the skirt.

Still further the invention contemplates the provision of a piston having a separable head and skirt connected together to wrist pin bosses depending from the head solely by the wrist pin, the bosses being free of contact with the skirt and the skirt being positioned against rocking relative to the head by a ring interposed between the upper edge of the skirt and the said head whereby said ring may perform the dual function of an oil ring and a spacer.

A further and important object of the said invention is to provide a piston having a separate head and skirt, the said skirt being connected by a wrist pin to the head solely through the medium of wrist pin bosses on the head and the skirt being positioned relative to the head by a free ring interposed between the upper rim of the skirt and the lower rim of the head.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a piston wherein a head carrying the usual compression rings is provided with depending wrist pin bosses in the form of round shanks set inwardly to a substantial extent of the periphery of the head and terminating in the bosses proper, a skirt extending around the bosses proper, and a wrist pin extending through the said skirt and the said bosses proper to form a connecting member between the said skirt and the said head, the said bosses being movable axially on the said wrist pin to some extent within the said skirt. The skirt may ordinarily rock on the said wrist pin beneath the head but is held against such rocking by a loose ring interposed between the upper rim of the skirt and the lower rim of the head.

All of which is more particularly described and ascertained hereinafter, by way of example, having reference to the accompanying drawings, wherein:—

Figure 1 is an elevation partly in section of a piston embodying the said invention;

Figure 2 is a plan of underside of the same;

Figure 3 is a detail perspective view of the head of the piston; and

Figure 4 is a detail perspective view of the skirt.

Similar characters of reference indicate similar parts in the several figures of the drawings.

A piston head 1 of quite a shallow form is shown, accommodating compression rings 2 in suitably provided grooves 3, and from the underside of the said head, which is convex to within a short distance of the periphery thereof providing a flat face or rim 4, are wrist pin bosses in the form of preferably cylindrical shanks 5 terminating in the bosses proper 6.

The shanks 5 of the said bosses are set inwardly of the rim 4 some extent and admit of being drilled as at 7 for inspection purposes, or hydraulic testing, so that their structure and suitability to withstand stresses which they are subjected to when in use may be readily determined. The said bosses proper 6 are bored at 8 to receive a wrist pin 9.

Thus, the head of the piston is of very simple construction admitting of easy casting by machine or otherwise, ready testing as to suitability for use, and easy production and machining due to ready accessibility to all surfaces requiring machining.

The skirt 10 is likewise of a very simple form, being simply a cylindrical shell having internal bosses 11 adapted to register with the bosses proper 6 of the piston head when the skirt is passed thereover, as shown in Figures 1 and 2, and it will be observed that the inner faces of the skirt bosses 11 are separated to a somewhat greater extent than in the outer faces of the bosses proper 6 of the piston head, so that when the skirt is assembled to the piston head by passing the wrist pin 9 through the bosses 11 and the bosses proper 6, the said bosses 11 and the bosses proper 6 are relatively spaced from one another as indicated by the reference numeral 12.

When the skirt is so assembled to the piston head, the upper edge or rim 13 of the skirt is spaced from the lower edge or rim 4 of the head so that ordinarily the skirt would be able to rock to quite an extent on the wrist pin 9 due to its spacing from the head of the piston, and to position the skirt relative to the head of the piston and prevent this rocking to an excessive extent, a piston ring 14 is inserted therebetween, this ring operating as an oil ring and, in use, is held against lateral displacement by the cylinder within which the piston works.

Thus, the oil ring 14 is accommodated in a continuous slot having no back such as in the case of the compression ring grooves, so that there is no direct mechanical connection between the upper end of the skirt and the head of the piston.

It will be obvious from this description that in order for heat to pass from the head to the skirt of the piston it must travel either through the medium of the oil ring 14 or through the medium of the wrist pin 9; and in either of these cases it must traverse two breaks or oil films, as in passing from the head to the ring 14 and from the ring to the upper edge of the skirt or as in passing from the bosses proper 6 to the wrist pin and from the wrist pin to the bosses 11 of the skirt. Incidentally, unless the entire piston, rings and wrist pin be constructed of the same metal, which is unusual, the transfer of heat described must take place through dissimilar metals which again tends to prevent such transfer taking place.

Beneath the oil ring 14 the skirt is provided with suitable oil drainage means such as a series of oil holes 15 extending through the skirt from a chamfered surface 16 immediately beneath the said oil ring 14.

I attach considerable importance to the floating nature of the head whereby the piston bosses proper 6 are slidable on the wrist pin by virtue of the spacing 12, and to the fact that lengthening of the shanks 5 of the wrist pin bosses due to the effects of heat is not restricted in any way by the skirt. Thus, such lengthening may take place without imposing any strains whatever on the skirt of the wrist pin, and diametrical expansion of the head would be accompanied by a simple compensating movement of wrist pin bosses proper 6 on the wrist pin also without imposing strains on the said wrist pin or on the skirt; so that the effects of heat and expansion are not accompanied by the setting up of any strains in the piston which would otherwise tend to weaken it, decrease its efficiency, or cause seizing or tightening of the piston in the cylinder when in use.

Further, the arrangement described admits of the wrist pin bosses being comparatively close together, the shorter centers admitting of a lighter wrist pin than would otherwise be suitable.

It will be further apparent that the method of mounting the skirt on the wrist pin bosses and the free relationship therebetween results in the transfer of force to the wrist pin in the best direction to avoid bending moments, the forces to which the shanks of the wrist pin bosses are subjected to being those of pure compression and tension which are not modified by varying conditions of temperature.

The skirt anchorage of the wrist pin bosses by the wrist pin is, as a result of the freedom from transmitted stresses, charged only with the supporting of the weight of the skirt and the oil ring which weight, of course, the wrist pin is amply able to take care of.

As the oil ring is not backed by any wall, being freely mounted between the skirt and the piston head, it is obvious that free escape of oil around the ring and consequent prevention of oil pumping beyond the head of the piston may be accomplished to a very high degree. The ring, performing the dual function of an oil ring and skirt aligning spacer between the skirt and the head, provides a remarkably simple and satisfactory method of meeting these requirements.

17 indicates reinforcing ribs extending from the bosses within the skirt and tapering off to the thickness of the skirt intermediate of the said bosses. 18 are flats on the outer surface of the skirt above the ends of the wrist pin to afford lubrication therefor.

This invention may be developed within the scope of the following claims without departing from the essential features of the said invention, and it is desired that the specification and drawings be read as being merely illustrative and not in a limiting sense, except as necessitated by the prior art.

What I claim is:—

1. In a piston, a piston head having wrist pin bosses depending therefrom, a tubular cylindrical skirt circumscribing the said bosses and spaced therefrom, a wrist pin extending through and connecting said skirt and said bosses, said skirt terminating short of said piston head, and means interposed between opposed surfaces of said skirt and said head restricting rocking of said skirt on said wrist pin relative to said head.

2. In a piston, a piston head having wrist pin bosses depending therefrom, a tubular cylindrical skirt circumscribing the said bosses, a wrist pin extending through and connecting said skirt and said bosses, said skirt terminating short of said piston head, and a loosely mounted oil ring interposed between opposed surfaces of said skirt and said head serving to restrict the rocking of said skirt on said wrist pin relative to said head.

3. In a piston, a piston head having wrist pin bosses depending therefrom, a tubular cylindrical skirt circumscribing the said bosses and spaced therefrom, a wrist pin extending through and connecting said skirt and said bosses, said skirt terminating short of said piston head, and freely floating oil ring interposed between opposed surfaces of said skirt and said head serving to resist the rocking of said skirt on said wrist pin relative to said head.

4. In a piston, a head, a separate skirt, said head having wrist pin bosses depending into said skirt, a wrist pin extending transversely through said skirt and said bosses and forming the sole support of said skirt from said bosses, said skirt terminating short of said piston head, said skirt being spaced from said bosses to permit movement of said bosses along said wrist pin, the upper edge of said skirt being spaced from the lower edge of said head, and an oil ring freely occupying the space between said skirt and said head whereby an oil film on each side of said ring may form to act as a heat insulator.

5. In a piston, a skirt, a transverse wrist pin having its ends entered into said skirt, a piston head having wrist pin bosses depending therefrom within said skirt and slidably mounted on said wrist pin, whereby said head is capable of floating relative to said skirt in the direction of the length of said wrist pin and said bosses are capable of relative movement along said wrist pin under the influence of changing temperature without imposing stresses on said skirt, and an oil ring operating as an aligning spacer between said skirt and said head.

6. In a piston, a piston head having wrist pin bosses depending therefrom, a tubular cylindrical skirt circumscribing and spaced from said bosses, a wrist pin extending freely through and connecting said skirt and said bosses, said skirt terminating short of said piston head, whereby said skirt and said bosses are capable of relative movement axially of said wrist pin, and means freely interposed between opposed surfaces of said skirt and said head restricting rocking of said skirt on said wrist pin relative to said head.

7. In a piston, a piston head having wrist pin bosses depending therefrom, a tubular cylindrical skirt circumscribing and spaced from said bosses, a wrist pin extending freely through and connecting said bosses whereby said skirt and said bosses are capable of relative movement axially of said wrist pin, and a freely floating oil ring interposed between opposed surfaces of said skirt and said head substantially as described.

8. In a piston, a piston head having wrist pin bosses depending therefrom, a tubular cylindrical skirt circumscribing and spaced from said bosses, a wrist pin freely extending through and connecting said skirt and said bosses whereby said skirt and said bosses are capable of relative movement axially of said wrist pin, the upper edge of said skirt being spaced from the lower edge of said head, and an oil ring freely occupying the space between said skirt and said head whereby an oil film of substantial thickness may form to act as a heat insulator between said head and said skirt.

9. In a piston, a piston head and a skirt secured thereto in spaced pivotal relation, an oil ring loosely fitted in the space between said head and said skirt and providing a definite spacing with respect to at least one of said parts whereby an oil film of substantial thickness may form on first one side of said ring and then the other as said piston reciprocates, and means below said ring for venting oil to the interior of said skirt.

10. In a piston, a piston head, a skirt secured to said head in slightly spaced pivotal relation, a bevelled face on the upper part of said skirt, a loosely mounted oil ring in the space between said head and said skirt and oil grooves in said bevelled face below said ring restricting the flow of oil to the space on either side of said ring.

In testimony whereof I affix my signature.

WARREN NOBLE.